Aug. 30, 1927.

A. V. MERSHON

ELECTRIC MICROMETER

Filed July 31, 1923

Inventor:
Alfred V. Mershon,
by *Alexander F. Lunt*
His Attorney.

Patented Aug. 30, 1927.

1,640,464

UNITED STATES PATENT OFFICE.

ALFRED V. MERSHON, OF SCHENECTADY, NEW YORK, ASSIGNOR TO GENERAL ELECTRIC COMPANY, A CORPORATION OF NEW YORK.

ELECTRIC MICROMETER.

Application filed July 31, 1923. Serial No. 654,942.

My invention relates to an electrical micrometric measuring means and the method of using the same. It more particularly relates to a system and the apparatus for measuring small distances between relatively moving and stationary bodies of magnetic material.

One of the objects of my invention is to provide a means for measuring micrometric dimensions between bodies of magnetic material and particularly the clearances between relatively moving bodies, as for instance the clearances between the relatively moving parts of a turbine.

A further object of my invention is to provide a suitable system of electrical connections and apparatus for accomplishing the objects stated above.

I accomplish the object of my invention by creating a magnetic field adjacent the point of measurement and electrically balancing by means of suitable circuits and instruments, the reactance of the coil which produces said magnetic field against the reactance of a similar coil the magnetic field of which can be adjusted to produce a balanced condition in the aforesaid circuits and providing means in combination with these circuits whereby after the circuits are balanced the distance or dimension under measurement can be determined.

In the accompanying drawing I have shown apparatus especially designed for the measurement of clearances between the relatively moving parts of a turbine or the variations in the clearances due to the vibration of the rotating parts, and the invention is hereinafter more fully explained with reference to said drawings to enable others to readily understand, adapt and use the invention. It should be understood, however, that the invention has many other applications as for instance, to determine the expansion of a body due to the application of heat, to determine the end-play or whipping of a rotating shaft, and many other applications which will readily suggest themselves to those skilled in the art.

Figure 1:
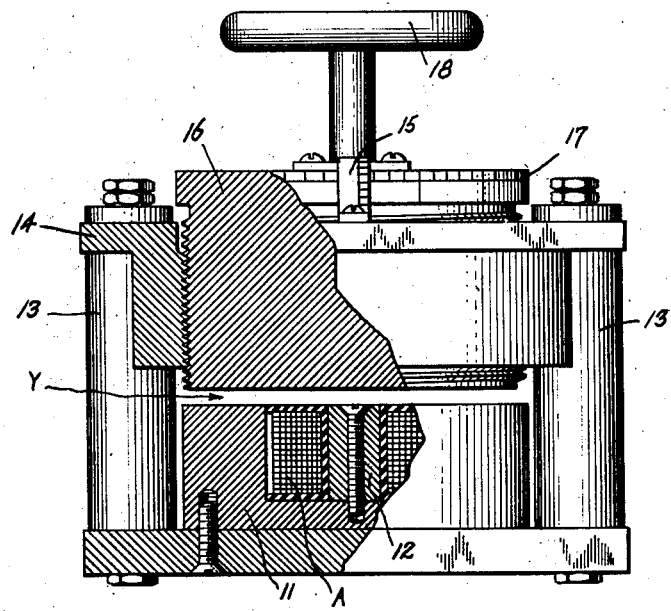
Figure 2:
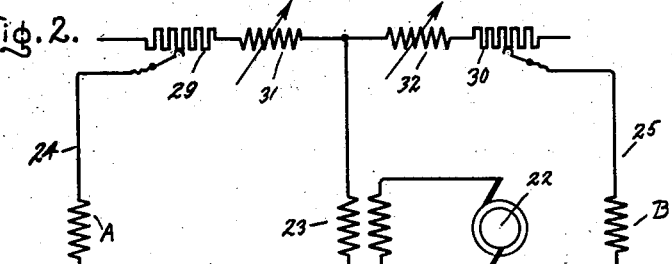
Figure 3:
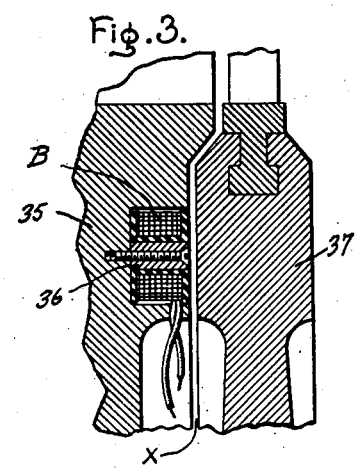
Figure 4:
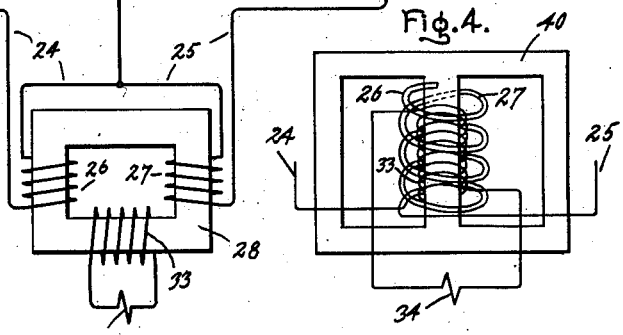

In the drawings, Fig. 1 is an elevation partly in section of the adjustable mounting for one of the balancing coils of my invention, together with a micrometrically adjustable plug for varying the magnetic field adjacent the said coil; Fig. 2 is a diagram showing one manner of electrically connecting the various apparatus in carrying out my invention; Fig. 3 is a partial sectional view of a turbine showing the manner of locating the other of the two balancing coils; and Fig. 4 is a diagram of a form of transformer which is particularly well adapted for use in accomplishing the object of my invention.

In practicing my invention, I employ two electrically similar coils and place one in the machine (see Fig. 3) where measurements of clearance or air gap are desired, and the other I mount in a specially designed support (see Fig. 1) which has an adjustable air gap. These coils are then connected into two differentially interconnected electric circuits having the same source of supply and to a suitable instrument to indicate any unbalance in the system caused by the condition of the magnetic field adjacent the aforesaid balancing coils.

To simplify the explanation of the invention and facilitate an understanding thereof, I will describe the form of apparatus shown in the drawings. I desire, however, to have it understood that I do not limit myself to this particular form of apparatus or circuit as other forms of apparatus and circuits will readily suggest themselves to those familiar with the art to which this invention pertains.

Referring to Fig. 1, A is an electrical coil embedded in a member 11 composed of magnetic material and having a core 12 of magnetic material which is flush with the surface of member 11. Mounted upon non-magnetic supports 13 is a member 14 of magnetic material which carries an indicator 15 and a micrometrically adjustable plug 16 also of magnetic material having a graduated surface 17 adapted to register with the indicator 15 and thereby indicate the distance between the core 12 and the plug 16, which I shall call Y. A knob or handle 18 is also provided on the top of the adjustable plug 16 to facilitate its adjustment.

Referring to Fig. 2, which is a diagram of connections, 22 is a source of alternating current, and 23 is a transformer connected to energize two differentially connected electric circuits 24 and 25. Connected in circuit 24 is the coil A shown in Fig. 1 and in series with it in a winding 26 of a transformer 28. The circuit 24 also contains a resistance 110

29 and a variable inductance 31, both of which are adjustable. Connected in circuit 25 is the coil B and in series with it are elements similar to those in circuit 24, namely a winding 27 of the transformer 28, a variable resistance 30 and a variable inductance 32. The transformer 28 also contains a third winding 33. The windings 26 and 27 of transformer 28 are adapted to oppose each other, and when balanced will induce no current in the winding 33. Connected to winding 33 of transformer 28 and influenced by the current induced therein is a recording instrument 34. The recording instrument 34 can be of any suitable type. In carrying out my invention, I employ an oscillograph.

Referring to Fig. 3, which is a partial sectional view of a turbine, B is an electrical coil having a core 36 of magnetic material embedded in the frame 35 and in position to measure the distance which I shall call X or any variation thereof between the frame 35 and the bucket wheel 37.

Referring to Fig. 4, 40 is a transformer core, the center leg of which carries the windings 26, 27 and 33 shown in and described in connection with Fig. 2. In this type of transformer the winding 33 is first wound upon the center leg of the core 40 and the windings 26 and 27 are then wound on top of the winding 33 in parallel and opposed to each other. With the windings assembled in this way it is possible to get practically zero induction in the winding 33 when the windings 26 and 27 equally oppose each other as the current flowing therein will be 180° out of phase when the circuits 24 and 25 are exactly balanced.

The operation of my invention is as follows: Assuming it is desired to determine the distance or clearance between a bucket wheel and a stationary part of a turbine, and assume first that the bucket wheel 37 is stationary and the distance X (Fig. 3) is to be determined. Since the results to be obtained depend upon the balance of circuits 24 and 25, the variable resistances 29 and 30 and the variable inductances 31 and 32 in circuits 24 and 25 respectively are first balanced against each other in any well known manner. When this is accomplished it will be noted that the only other variable element in these circuits is the air gap of coil A and therefore the circuits will be unbalanced until the air gap Y adjacent the coil A in circuit 24 is equal to the air gap X adjacent the coil B in circuit 25. The micrometrically adjustable plug 16, which in this case is of the same material as the bucket wheel, is adjusted until the reactance of coil A is equal to the reactance of coil B when the coils A and B are so balanced and the remaining variable elements in the circuits 24 and 25 are balanced as they were assumed to be, no current will be induced into coil 33 of transformer 28 and consequently no deflection will occur on the instrument 34. The distance X can then be read directly from the graduated surface 17 of the plug 16 and the indicator 15 (Fig. 1). In this operation the magnetic fields of coils A and B were unbalanced until the distances X and Y were equal. The reason for this is that the amount of magnetic material in the magnetic field of a coil will effect its reactance, and since the location of the magnetic material with respect to the magnetic field of the coil will determine the amount of iron in the magnetic field of the coil, it will, therefore, be seen that when the distances X and Y are equal, the effect on the magnetic circuits of coils A and B caused by the plug 16 and the wheel 37 will be the same and that the reactance of coils A and B, respectively, will be equal, and as a result the instrument 34 will show no deflection.

Assume now that it is desired to measure the amplitude and period of any vibrations which may occur in the wheel 37 due to its high rotative speed. In this case the operations are carried out as in the previous example with the wheel 37 stationary. With this setting it will be seen that the wheel 37 is then in its normal position and no deflection will be registered by the recording instrument 34. The instrument 34 in this case being an oscillograph or like instrument, it will also be evident that if the wheel runs perfectly true no change in the distance X will take place, but assuming that the wheel 37 vibrates as it rotates, the period and amplitude of these vibrations will be registered upon the film or chart of the instrument 34 in the form of waves the period of which can be determined by comparison with a time curve or the like upon the film or chart, and the amplitude of the vibrations can also be read off the same film or sheet when the amplitude of swing of the instrument recording means is calibrated against the amplitude of vibration of the wheel 37. A typical calibration curve is represented by the following when the mechanical characteristic of the magnetic circuits of the two coils A and B are the same.

| Mils between the wheel and core of coil B (Fig. 3). | Deflection of oscillograph needle from zero. |
|---|---|
| 50 | 0 in millimeters. |
| 40 | 10 |
| 30 | 21 |
| 20 | 33 |
| 10 | 49 |
| 5 | 59 |
| 0 | 68 |

These figures were obtained by first adjusting the circuits 24 and 25 to a balance with the air gaps X and Y adjacent the coils A and B set at 50 mils, which was the normal distance or gap between the bucket wheel 37 and the frame 35 of Fig. 3.

The above values were made in an actual test by measuring the distance X in each case and noting the deflection of the oscillograph beam. It will be noted that the values given above do not take into consideration the disstance of the point under measurement when in positions away from the coil X at a greater distance than the normal gap, in this illustration 50 mils. The reason for not doing so is because the wheel 37 will vibrate an equal distance on each side of its normal position, and, therefore, only the one measurement is necessary. It is desirable, for the sake of greater accuracy, to measure the nearest half of the approaching and retiring swing of the bucket wheel.

While I have shown and described my invention as applied to the measurement of distances between metallic bodies it should be understood that by employing suitable means, other phenomena can be determined, such as the pressure of a gas or liquid in a chamber, in which case the variations in the magnetic circuit of coil B would be influenced by variations in the pressure of the gas or liquid under measurement through suitable means as for instance a flexible diaphragm of magnetic material adjacent the coil B.

As many changes could be made in the above described system and apparatus and many apparently widely different embodiments of this invention might be made without departing from the scope thereof as noted in the preceding paragraph, it is intended that all matter contained in the foregoing description or shown in the accompanying drawings shall be interpreted as illustrative and not in a limiting sense.

What I claim as new and desire to secure by Letters Patent of the United States, is:—

1. Apparatus for measuring the amplitude and frequency of a rapidly vibrating body comprising a pair of differentially connected electric circuits, a source of alternating current for simultaneously energizing both of said circuits, a coil in one circuit positioned with respect to the vibrating body so as to have its reactance varied by such vibrations, a coil in the other circuit provided with means for manually adjusting its reactance, adjusting impedances in both circuits, a transformer having primary coils connected in opposition and a secondary coil, said primary coils being included in said differentially connected circuits, and an oscillograph recording instrument connected to said secondary coil.

2. Apparatus for determining the period and amplitude of vibrations of a vibrating body, consisting of two differentially interconnected circuits only one of which is electromagnetically influenced by the vibrations of the body under observation, a common source of alternating current for simultaneously energizing both of said circuits, windings in said differentially interconnected circuits adapted to oppose each other, and a third winding in inductive relation with said first mentioned windings adapted to detect any unbalance in the above circuits and influence an instrument for recording the period and amplitude of the vibrations of said body.

In witness whereof, I have hereunto set my hand this 30th day of July, 1923.

ALFRED V. MERSHON.